US012612040B2

(12) United States Patent (10) Patent No.: US 12,612,040 B2
Jun et al. (45) Date of Patent: Apr. 28, 2026

(54) OPERATING METHOD OF INTELLIGENT VEHICLE DRIVING CONTROL SYSTEM

(71) Applicant: Hyundai Kefico Corporation, Gunpo (KR)

(72) Inventors: Young Ho Jun, Seoul (KR); Do In Kwon, Gunpo (KR); Hyung Jin Shin, Seoul (KR); Jung Mook Choo, Seoul (KR)

(73) Assignee: Hyundai Kefico Corporation, Gunpo (KR)

( * ) Notice: Subject to any disclaimer, the term of this patent is extended or adjusted under 35 U.S.C. 154(b) by 322 days.

(21) Appl. No.: 17/881,922

(22) Filed: Aug. 5, 2022

(65) Prior Publication Data

US 2023/0041192 A1 Feb. 9, 2023

(30) Foreign Application Priority Data

Aug. 6, 2021 (KR) ........................ 10-2021-0103797

(51) Int. Cl.
 *B60W 30/14* (2006.01)
 *B60W 50/00* (2006.01)
(52) U.S. Cl.
 CPC ...... *B60W 30/143* (2013.01); *B60W 50/0098* (2013.01); *B60W 2050/0028* (2013.01); *B60W 2520/10* (2013.01); *B60W 2520/30* (2013.01); *B60W 2552/30* (2020.02); *B60W 2554/40* (2020.02); *B60W 2556/05* (2020.02); *B60W 2556/45* (2020.02); *B60W 2720/10* (2013.01)
(58) Field of Classification Search
 CPC ........... B60W 30/143; B60W 50/0098; B60W 2050/0028; B60W 2520/10; B60W 2520/30; B60W 2552/30; B60W 2554/40; B60W 2556/05; B60W 2556/45; B60W 2720/10; B60W 2720/103
 USPC .......................................................... 701/93
 See application file for complete search history.

(56) References Cited

U.S. PATENT DOCUMENTS

| 9,783,182 B2 * | 10/2017 | Lee | ................. B60W 30/18145 |
| 11,858,513 B2 * | 1/2024 | Jokela | .................. B60W 30/16 |
| 2010/0076675 A1 * | 3/2010 | Barth | ................. G01C 21/3469 |
| | | | 701/532 |

(Continued)

FOREIGN PATENT DOCUMENTS

| CN | 116653962 A | * | 8/2023 | ............ B60W 30/18 |
| JP | 2011-235777 A | | 11/2011 | |

(Continued)

*Primary Examiner* — Helal A Algahaim
*Assistant Examiner* — Ashleigh Nicole Turnbaugh
(74) *Attorney, Agent, or Firm* — Fox Rothschild LLP

(57) ABSTRACT

In one aspect, an operating method of an intelligence vehicle driving control system is provided that comprises: a collecting step of collecting big data including a wheel torque and a speed for every vehicle type and traffic information; a torque calculating step of learning the big data using a predetermined machine learning model and inputs a specific desired speed profile to the machine learning model to calculate a motor torque of a driving vehicle; and an optimal speed profile deriving step of calculating an energy consumption required to generate the calculated motor torque using a predetermined dynamic programming method and a reverse vehicle dynamic model and deriving an optimal speed profile in which the energy consumption is minimized.

11 Claims, 6 Drawing Sheets

(56) References Cited

U.S. PATENT DOCUMENTS

2018/0162397 A1 *   6/2018   Eo ....................... B60W 30/182
2018/0330178 A1    11/2018   el Kaliouby et al.
2021/0070315 A1 *   3/2021   Thompson ............... B60K 6/48

FOREIGN PATENT DOCUMENTS

| JP | 2015-214294 | A | 12/2015 |
| JP | 2017-136943 | A | 8/2017 |
| KR | 10-1655663 | B1 | 9/2016 |
| KR | 102136400 | B1 * | 6/2018 |
| KR | 10-2018-0096114 | A | 8/2018 |
| KR | 10-2019-0109624 | A | 9/2019 |
| KR | 10-2020-0003309 | A | 1/2020 |
| KR | 10-2021-0051753 | A | 5/2021 |
| KR | 10-2021-0076223 | A | 6/2021 |
| WO | 2011/036855 | A1 | 3/2011 |

* cited by examiner

[FIG. 1]
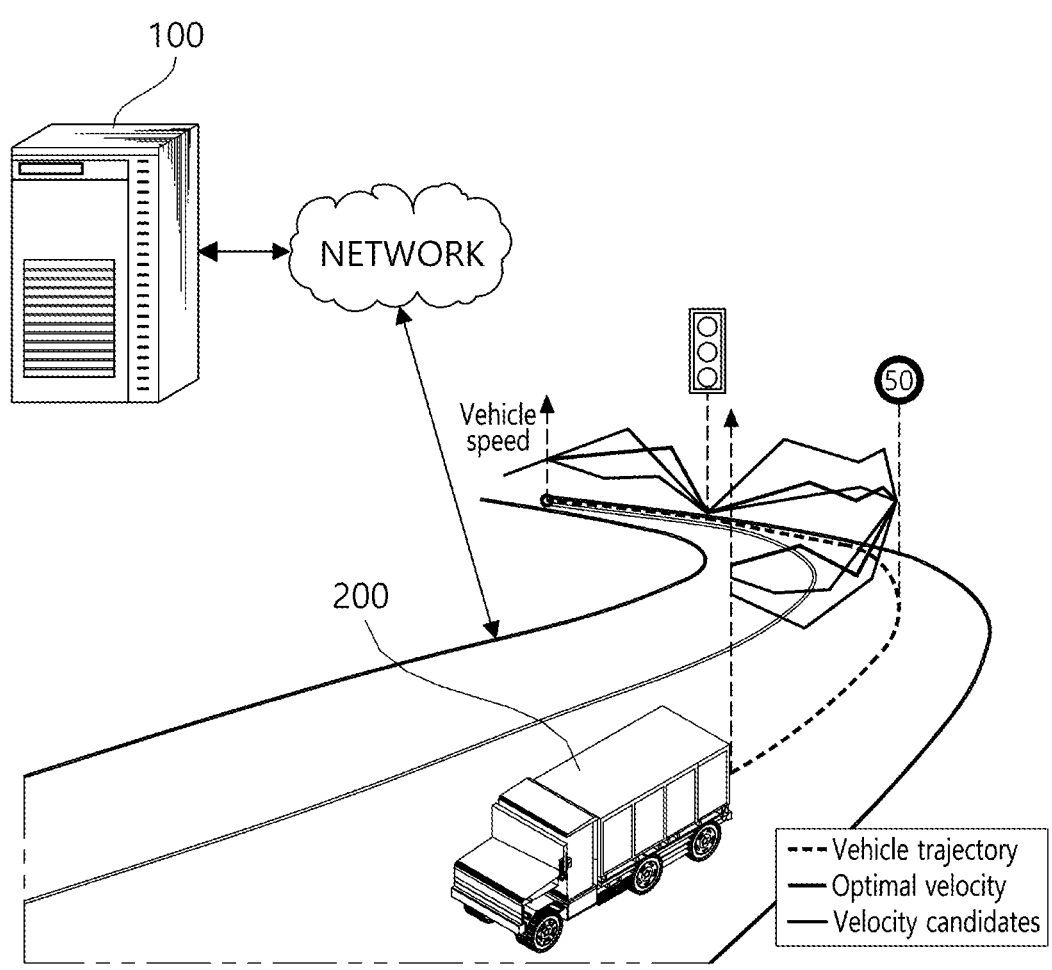

[FIG. 2]
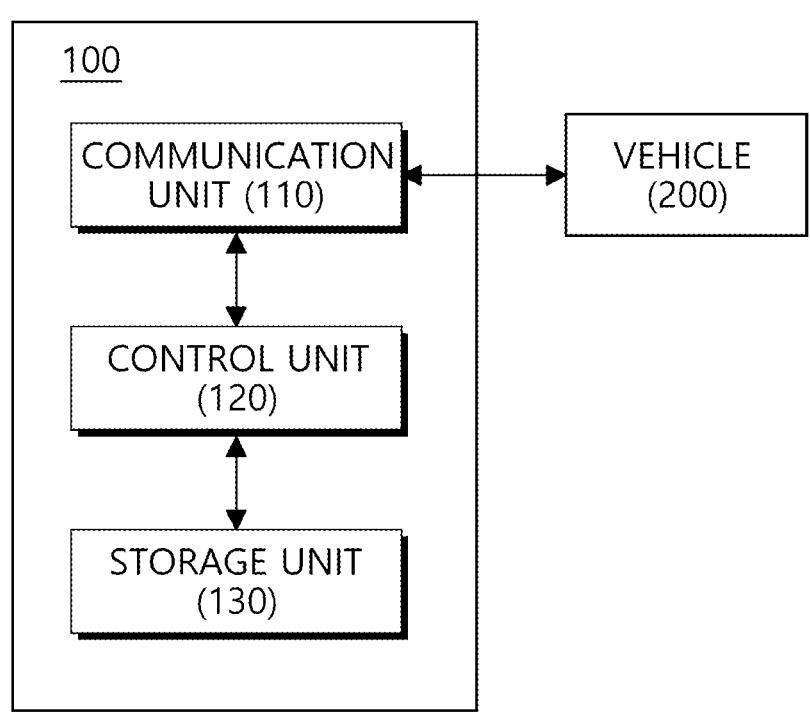

[FIG. 3A]
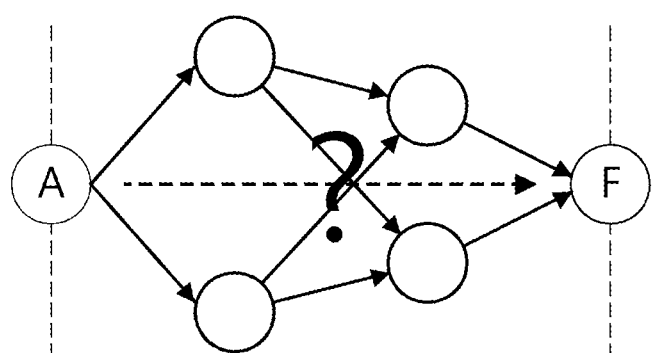
[FIG. 3B]
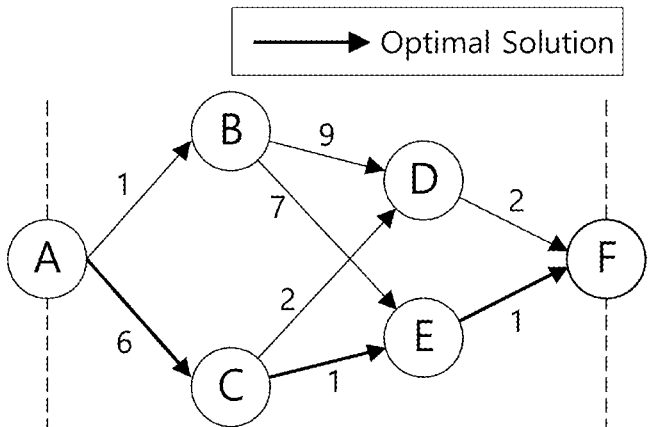

[FIG. 6]
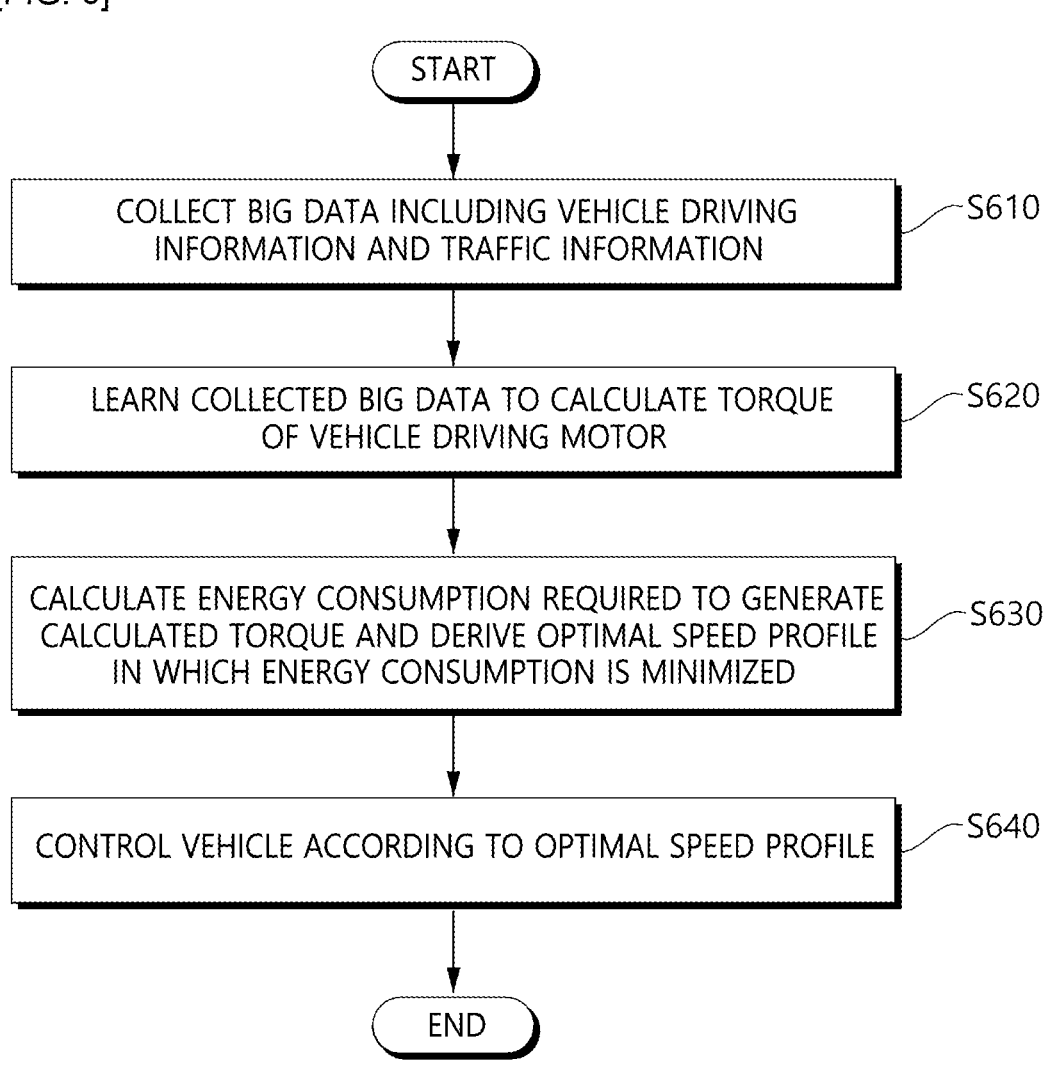

OPERATING METHOD OF INTELLIGENT VEHICLE DRIVING CONTROL SYSTEM

CROSS-REFERENCE TO RELATED APPLICATIONS

This application claims priority to and the benefit of Korean Patent Application No. 10-2021-0103797 filed in the Korean Intellectual Property Office on Aug. 6, 2021, the entire contents of which are incorporated herein by reference.

FIELD

The present disclosure relates to an operating method of an intelligent vehicle driving control system.

BACKGROUND

Recently, an intelligent transportation system (ITS) such as an advanced driver assistance system (ADAS) and a vehicle-to-infrastructure (V2I) is developed to cause big changes in the automobile industry.

Amid these changes, vehicle speed optimization technology using driving data and road traffic infrastructure information also improves fuel consumption, energy efficiency, and driving safety to be proposed as a new paradigm in the mobility industry.

Specifically, the effect is more pronounced in the public transportations which repeatedly travel the same route and purpose built vehicles (PBV) such as transportation vehicles, more accurately predicts a total amount of energy consumed in the driving section, and has an advantage in terms of energy management.

Further, a global optimal speed profile varies depending on several factors such as a road surface condition, a road slope, and traffic congestion, so that intensive data processing on driving road shapes and a traffic conditions is necessary in a large capacity cloud system with a high computational power.

An optimal speed profile calculated in the cloud server is received by a vehicle controller by means of over-the-air programming and control to follow the optimal speed profile as a target speed is performed so that the vehicle control system may improve the energy efficiency and ensure the driving stability.

In the meantime, a smart driving agent system based on vehicle driving information big data and a virtual physics system of the related art includes a communication module which transmits and receives data with a vehicle, a memory in which a program including safety information and fuel efficiency information and generating an optimal driving model to control the vehicle is stored, and a processor which executes a program stored in the memory.

At this time, as the program is executed, the processor generates a virtual physics system based on driving information big data collected from a vehicle or a vehicle of the same model as the vehicle and vehicle characteristic data, generates an optimal driving model by means of the learning based on an artificial intelligence learning algorithm for a simulation result of the virtual physics system, and provides the generated optimal driving model to the vehicle by means of the communication module. The driving information big data includes one or more of vehicle driving information, driving road traffic information, and driving road attribute information.

The above-described generates a certain virtual physics system based on the driving information big data collected from the vehicle or a vehicle of the same model as the vehicle and the vehicle characteristic data and derives an optimal driving model through the artificial intelligence based thereon.

SUMMARY

In one aspect, an operating method of an intelligent vehicle driving control system is provided which considers various driving factors, for example including the current traffic situation and derives an optimal speed profile by a statistical technique, a dynamic programming method, and/ or a machine learning.

In a further aspect, an operating method of an intelligence vehicle driving control system is provided that comprises: collecting big data including a wheel torque and a speed for every vehicle type and traffic information, by a communication unit (sometimes referred to herein as a collecting step); learning the big data comprising using a predetermined machine learning model and inputs a specific desired speed profile to the machine learning model to calculate a motor torque of a driving vehicle, by a control unit (sometimes referred to herein as a torque calculating step; and calculating an energy consumption required to generate the motor torque comprising using a predetermined dynamic programming method and reverse vehicle dynamic model and deriving an optimal speed profile in which the energy consumption is minimized, by the control unit (sometimes referred to herein as an optimal speed profile deriving step).

In a related aspect, an operating method of an intelligence vehicle driving control system is provided that comprises: a collecting step that comprises collecting big data including a wheel torque and a speed for every vehicle type and traffic information, by a communication; torque calculating step that comprises learning the big data comprising using a predetermined machine learning model and inputs a specific desired speed profile to the machine learning model to calculate a motor torque of a driving vehicle, by a control unit; and an optimal speed profile deriving step comprising calculating an energy consumption required to generate the motor torque comprising using a predetermined dynamic programming method and reverse vehicle dynamic model and deriving an optimal speed profile in which the energy consumption is minimized, by the control unit.

The operating method suitably may further include: controlling the driving vehicle according to the optimal speed profile, by the control unit.

The optimal speed profile deriving step suitably may comprise: a step of dividing a front section of the driving vehicle into at least two according to a speed condition for every section and deriving the optimal speed profile for each of at least two front sections.

The optimal speed profile deriving step suitably may comprise: a step of updating traffic information for the front section excluding a front section in which the vehicle travels, among two or more front sections, by the control unit.

The optimal speed profile deriving step suitably may comprise: a step of normalizing speed values of all the vehicles which travel on the same path as the driving vehicle to calculate an average and a variance, determining a upper speed limit and a lower speed limit of the driving vehicle using the calculated average and the above-described variance, and derive the optimal speed profile in consideration of the upper speed limit and the lower speed limit, by the control unit.

In a preferred optimal speed profile deriving step, when the upper speed limit and the lower speed limit suitably are determined, the control unit applies a weight to the variance by considering whether to drive in accordance with the flow of the surrounding vehicle or independently drive.

In a preferred optimal speed profile deriving step, the control unit suitably considers the optimal speed according to a curvature of the road in which the driving vehicle travels as a deriving condition of the optimal speed profile.

The torque calculating step suitably comprises a step of learning a relationship of the wheel torque and the speed among the big data, by the machine learning model.

In a preferred torque calculating step, the control unit suitably inputs a desired speed profile to the machine learning model to calculate the motor torque.

The machine learning model suitably may comprise a convolutional neural network (CNN) and a recurrent neural network (RNN), or other system.

In a preferred aspect, the machine learning model suitably learns a rolling resistance, a gradient resistance, and an air resistance among the traffic information to be modeled.

According to the driving method of an intelligence vehicle driving control system according to an exemplary embodiment of the present disclosure, an optimal speed profile is derived using a machine learning model which predicts a driving torque and a dynamic programming which considers various driving factors including a current traffic situation so that it is possible to drive at a speed optimized at the current traffic situation without manipulation of a driver, thereby improving a fuel efficiency or a curb weight to minimize vehicle energy consumption.

Further, by the intelligence driving control by reflecting real-time traffic information, it is defined as full automation level from a start point to a destination according to four levels of driving automation stipulated by society of automotive engineers (SAE) and is utilized for longitudinal control of a vehicle of level 4 of automation.

In a further aspect, an operating system, including for an intelligent vehicle driving control system, is provided, the operating system comprising: a) a controller or communication unit configured to collect big data including a wheel torque and a speed for every vehicle type, and traffic information, by a communication unit; and b) a control unit configured to: learn the big data using a predetermined machine learning model and inputs a specific desired speed profile to the machine learning model to calculate a motor torque of a driving vehicle; and calculate an energy consumption required to generate the motor torque using a predetermined dynamic programming method and a reverse vehicle dynamic model and deriving an optimal speed profile in which the energy consumption is reduced or minimized.

In a further aspect, vehicles are provided that are configured to carry a method as disclosed herein and/or comprise a system as disclosed herein.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

FIG. 1 is a conceptual view of an intelligence vehicle driving control system according to an exemplary embodiment of the present disclosure;

FIG. 2 is a block diagram of an intelligence vehicle driving control system according to an exemplary embodiment of the present disclosure;

FIGS. 3A and 3B are conceptual views for explaining a dynamic programming method according to an exemplary embodiment of the present disclosure;

FIG. 4 is a conceptual view illustrating an example of a process of deriving an optimal speed profile by a dynamic programming method according to an exemplary embodiment of the present disclosure;

FIG. 5 is a conceptual view illustrating an example of a process of deriving an optimal speed profile using a machine learning model and a reverse vehicle dynamics model according to an exemplary embodiment of the present disclosure; and FIG. 6 is a flowchart of an operating method of an intelligence vehicle driving control system according to an exemplary embodiment of the present disclosure.

DETAILED DESCRIPTION OF THE EMBODIMENT

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the figures, it should be noted that even though the parts are illustrated in different drawings, it should be understood that like reference numerals refer to like parts of the present disclosure throughout the several figures of the drawing. Further, hereinafter, exemplary embodiments of the present disclosure will be described. However, it should be understood that the technical spirit of the disclosure is not restricted or limited to the specific embodiments, but may be changed or modified in various ways by those skilled in the art to be carried out.

FIG. 1 is a conceptual view of an intelligence vehicle driving control system according to an exemplary embodiment of the present disclosure. FIG. 2 is a block diagram of an intelligence vehicle driving control system according to an exemplary embodiment of the present disclosure.

Referring to FIGS. 1 and 2, an intelligence vehicle driving control system 100 according to an exemplary embodiment of the present disclosure receives big data related to vehicle driving information (a wheel torque and a speed) for every vehicle type and current traffic information by means of a network and calculate an optimal speed profile of the vehicle 200 using the received big data.

For example, the network 10 may include a network, such as a $3^{rd}$ generation partnership project (3GPP) network, a long term evolution (LTE) network, a world interoperability for microwave access (WIMAX) network, Internet, a local area network (LAN), a wireless local area network (wireless LAN), a wide area network (WAN), a personal area network (PAN), a Bluetooth network, a near field communication (NFC) network, a satellite broadcasting network, an analog broadcasting network, a digital multimedia broadcasting (DMB) network, WiFi, V2X, and V2V, but are not limited thereto.

As discussed, vehicle 200 may be an autonomous vehicle which repeatedly operates for a predetermined time and a route for a predetermined period or more, such as an express bus or a large cargo vehicle, but is not limited thereto.

The intelligence vehicle driving control system 100 according to the exemplary embodiment of the present disclosure is a cloud system which collects a vehicle trajectory, vehicle driving information, and a traffic situation from the outside and derives an optimal speed profile of the vehicle 200 using the collected information and includes a communication unit 110, a control unit 120, and a storage unit 130.

The communication unit 110 may receive a wheel torque and a speed for every vehicle type, from an external server. Further, the communication unit 110 may receive traffic information (regional information or a road slope) from the external server. Here, information including a wheel torque, a speed, and traffic information may be defined as big data.

The control unit 120 may derive an optimal speed profile based on the collected big data. The dynamic programming may be used to derive the optimal speed profile. The dynamic programming refers to an analysis technique which divides a complex system into a plurality of sub systems to check all the methods to solve the problem and combine the derived values to find an optimal solution of the entire system.

The control unit 120 may apply a machine learning model which predicts a torque of a vehicle driving motor to make the accuracy of the dynamic programming operation robust during the optimal speed profile deriving process using the dynamic programming. Here, the machine learning model may include a convolutional neural network (CNN) and a recurrent neural network (RNN).

The control unit 120 learns a relationship of a speed and a wheel torque of the driving information and predicts a torque of a vehicle driving motor as the learning result. The control unit 120 operates only the relationship of the speed and the wheel torque among the driving information so that a more accurate operation is possible within a short time. The control unit 120 improves an accuracy of the optimal speed profile in which the energy consumption is minimized using a prediction torque of the vehicle driving motor. The control unit 120 may generate driving-related update information including an optimal speed profile.

The controller 210 may transmit driving-related update information to the vehicle 200 by an over the air (OTA) manner by means of the communication unit 110. The vehicle 200 may include a connectivity control unit (CCU) to receive the vehicle driving-related update information. The vehicle may include a vehicle control unit (VCU) which controls a required torque of the vehicle driving motor to follow an optimal speed profile according to the update information.

The storage unit 130 stores the collected big data. The storage unit 130 stores an algorithm for performing the dynamic programming. The storage unit 130 may store a machine learning model for predicting a torque of the vehicle driving motor.

The intelligent vehicle driving control system 100 according to the exemplary embodiment of the present disclosure may be applicable to all vehicle systems, such as internal combustion engines, battery electric vehicles, and hydrogen fuel cell vehicles.

Hereinafter, an optimal speed profile deriving process using the dynamic programming method and the machine learning model will be described in detail.

FIGS. 3A and 3B are conceptual views for explaining a dynamic programming method according to an exemplary embodiment of the present disclosure.

Referring to FIGS. 3A and 3B, an example of a dynamic programming method which derives an optimal solution is identified. FIG. 3A illustrates an example of an optimal solution deriving method before applying the dynamic programming method. FIG. 3B illustrates an example of an optimal solution deriving method according to the dynamic programming method.

In FIG. 3A, before applying the dynamic programming method, it is confirmed that an optimal solution is derived in a single node A and then immediately transmitted to a node "F". At this time, an error due to the calculation of the single node may be generated in the optimal solution.

In FIG. 3B, it is confirmed that an optimal solution is derived from a plurality of nodes according to the dynamic programming method. In a plurality of nodes including nodes "A" to "E", the problems of the entire system are separately processed, a value derived from each node is transmitted to a node "F", and various values are combined in the node F so that more accurate final optimal solution may be derived.

Figure 4:
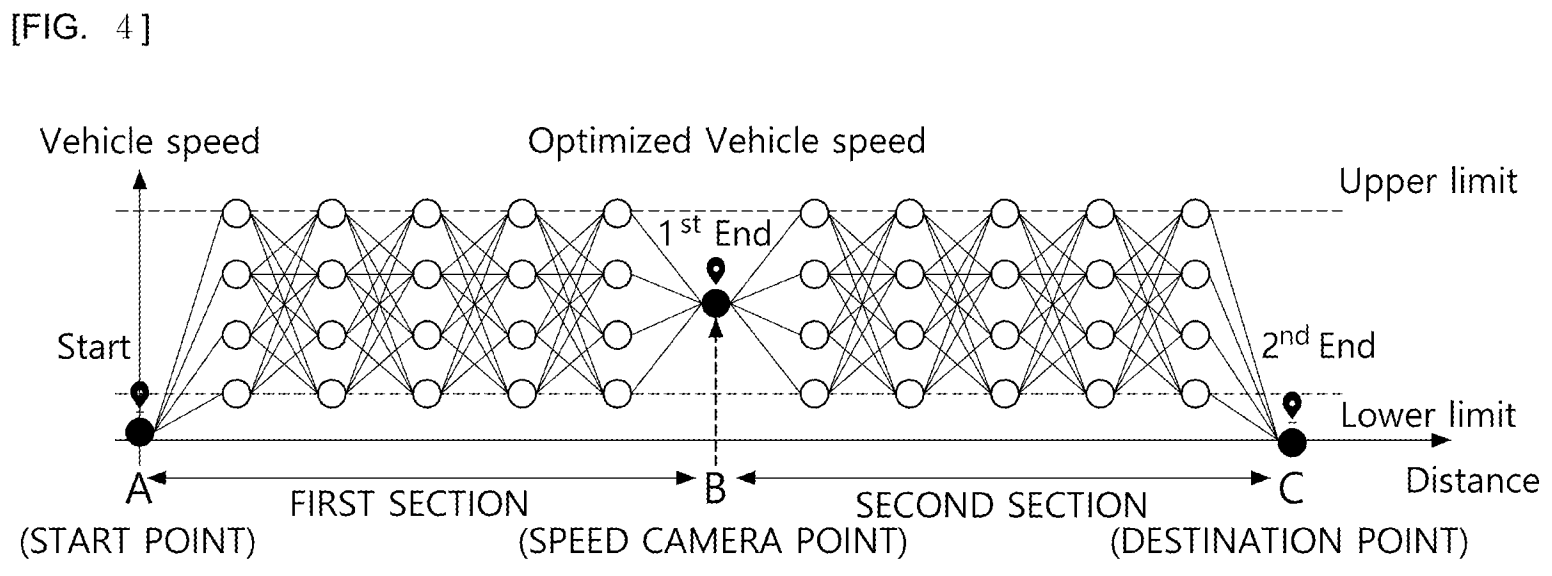

FIG. 4 is a conceptual view illustrating an example of a process of deriving an optimal speed profile by a dynamic programming method according to an exemplary embodiment of the present disclosure.

Referring to FIG. 4, the intelligence vehicle driving control system 100 according to the exemplary embodiment of the present disclosure may derive the optimal speed profile according to the dynamic programming method which considers real-time vehicle driving information and the traffic situation. The operation speed of the dynamic programming method is limited so that the intelligence vehicle driving control system 100 divides a driving road of the vehicle into specific sections and derives an optimal speed profile for every road section.

According to the exemplary embodiment, when the intelligence vehicle driving control system 100 divides a section from a start point "A" to a speed camera point "B" as a first section, divides a section from the speed camera point "B" to a destination "C" as a second section, there is a speed condition constrained for every section so that the computational amount may be reduced. Further, the intelligence vehicle driving control system 100 updates a traffic situation of the second section which changes during the driving of the first section in real time to derive the optimal speed profile.

Further, the intelligence vehicle driving control system 100 applies a upper speed limit and a lower speed limit to the dynamic programming method to reduce the computational amount. The upper speed limit and the lower speed limit may be an array value according to the vehicle location.

That is, the intelligence vehicle driving control system 100 normalizes speeds of all the vehicles which travel the same section as the vehicle which currently travels to derive an average and a variance and determines the upper speed limit and the lower speed limit using the derived average and variance.

When the upper speed limit and the lower speed limit are determined, the intelligence vehicle driving control system 100 may apply a weight to the variance value by considering whether to drive in accordance with the flow of the surrounding vehicles or independently drive for more actively improvement of the fuel efficiency and the curb weight.

Here, an average of the vehicle speed is μ, a variance of the vehicle speed is σ, and a weight is k and the upper speed limit is μ+σ·k, and the lower speed limit is μ−σ·k.

Figure 5:
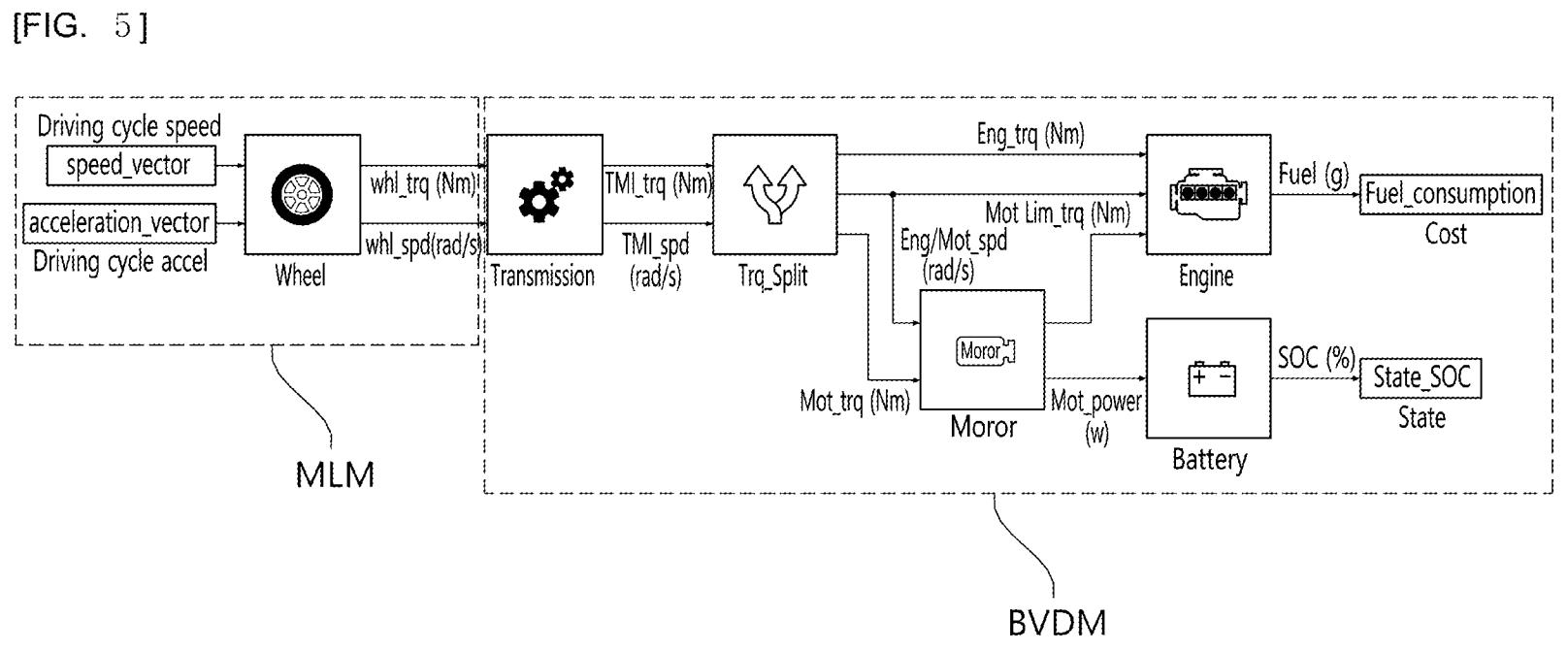

FIG. 5 is a conceptual view illustrating an example of a process of deriving an optimal speed profile using a machine learning model and a reverse vehicle dynamics model according to an exemplary embodiment of the present disclosure.

Referring to FIG. 5, the intelligence vehicle driving control system 100 may calculate a consumed energy amount for every node according to the dynamic programming method using a reverse vehicle dynamic model (BVDM).

The reverse vehicle dynamic model (BVDM) may be modeled based on the following Equation 1.

$$m_{eq}\frac{dv}{dt} = F_{trac} - F_{real} - F_{aero} - F_{grade} - F_{brake} \qquad \text{<Equation 1>}$$

$$F_{trac} = \frac{n_\gamma \gamma_{fd}}{R_{wh}} T_{motor}$$

$$F_{roll} = mg\cos(\alpha)(r_o + r_1 v)$$

$$F_{aero} = \frac{1}{2}\rho A_f C_d v^2$$

$$F_{grade} = mg\sin(\alpha)$$

$$T_{wh} = R_{wh}(F_{trac} - F_{brake}) = R_{wh}\left(m_{eq}\frac{dv}{dt} + F_{roll} + F_{aero} + F_{grade}\right)$$

In Equation 1, v is a vehicle speed, $F_{trac}$ is a driving force, $F_{roll}$ is a rolling resistance, $F_{aero}$ is an aero resistance, $F_{grade}$ is a gradient resistance, $F_{brake}$ is a braking power, $m_{eq}$ is a vehicle equivalent mass, $\eta_\gamma$ is a reduction gear efficiency, $\gamma_{fd}$ is a reduction gear ratio, $R_{wh}$ is a wheel dynamic radius, $T_{motor}$ is a motor torque (driving torque), $T_{wh}$ is a wheel torque, a is a road gradient, $r_0$, $r_1$ are gradient resistance coefficients, $A_f$ is a vehicle area, $C_d$ is an aerodynamic coefficient, and ρ is an air density.

Further, the intelligence vehicle driving control system 100 learns a relationship of the vehicle speed and the wheel torque using the machine learning model MLM and reversely performs the internal operation to calculate a consumed fuel energy amount of the wheel torque.

A deep-learning model of the related art learns the relationship of the vehicle speed and the fuel consumption by means of AI so that various input values are required. Further, many computational amounts are requested so that an operating system having a high operating speed is requested.

However, the machine learning model according to the exemplary embodiment of the present disclosure learns the relationship of the vehicle speed and the wheel torque using only the limited driving information so that the accurate operation is possible within a shorter time than the related art.

FIG. 6 is a flowchart of an operating method of an intelligence vehicle driving control system according to an exemplary embodiment of the present disclosure.

Referring to FIG. 6, the operating method of the intelligence vehicle driving control method according to the exemplary embodiment of the present disclosure derives an optimal speed profile of the vehicle using traffic information including vehicle driving information and road information of a start point and the destination and includes a collecting step S610, a torque calculating step S620, an optimal speed profile deriving step S630, and a vehicle control step S640.

In the collecting step S610, the intelligence vehicle driving control system 100 collects big data related to a wheel torque and a speed for every vehicle type and traffic information (regional information and a road slope) from the external server.

In the torque calculating step S620, the intelligence vehicle driving control system 100 learns the collected big data using the machine learning model and inputs a desired specific speed profile to the machine learning model to calculate a torque of a vehicle driving motor. At this time, the machine learning model may be modeled by learning three factors of the driving resistance. The three factors of the driving resistance may include a rolling resistance, a gradient resistance, and an air resistance.

In the optimal speed profile deriving step S630, the intelligence vehicle driving control system 100 derives an optimal speed profile using a predetermined dynamic programming method and the reverse vehicle dynamic model. At this time, the intelligence vehicle driving control system 100 calculates a fuel and power consumption required to generate a torque of the motor driving motor calculated in the torque calculating step S620 using a reverse vehicle dynamic model.

Further, the intelligence vehicle driving control system 100 may derive a global optimal speed profile in which the fuel and power consumption is minimized in the entire driving section of the vehicle using the dynamic programming method.

Further, the intelligence vehicle driving control system 100 normalizes the speed values of all vehicles which travel the same route as the current vehicle 200 to calculate an average and a variance and determines a upper speed limit $\mu+\sigma\cdot k$, and a lower speed limit $\mu-\sigma\cdot k$ using the calculated average and variance, in order to derive the optimal speed profile to which the traffic information is reflected in real time.

Further, the intelligence vehicle driving control system 100 divides the road section in a predetermined distance unit or a specific section (for example, 10 km unit or a speed camera point) to reflect the traffic situation in real time and repeatedly derives the optima speed profile for every section, and frequently updates the optimal speed profile.

Further, in order to ensure the driving stability according to the curvature of the road, the intelligence vehicle driving control system 100 considers an optimal speed according to the curvature of the road as an optimal speed profile deriving condition.

In the vehicle control step S640, the intelligence vehicle driving control system 100 controls the vehicle to follow the optimal speed profile.

The above description illustrates a technical spirit of the present disclosure as an example and various changes, modifications, and substitutions become apparent to those skilled in the art within a scope of an essential characteristic of the present disclosure. Therefore, as is evident from the foregoing description, the exemplary embodiments and accompanying drawings disclosed in the present disclosure do not limit the technical spirit of the present disclosure and the scope of the technical spirit is not limited by the exemplary embodiments and accompanying drawings.

As understood by those skilled in the art, steps and/or operations according to the present disclosure may be performed in different orders, or in parallel, or simultaneously in different exemplary embodiments for the other epoch.

Depending on the exemplary embodiment, some or all of the steps and/or operations may be at least partially implemented or performed using one or more processors which run instructions, programs, interactive data structures, clients and/or servers stored in one or more non-transitory computer-readable media. One or more non-transitory computer-readable medium may be software, firmware, hardware, and/or an arbitrary combination thereof. Further the function of the "module" discussed in the present specification may be implemented by software, firmware, hardware, and/or an arbitrary combination thereof.

What is claimed is:

1. An operating method of an intelligence vehicle driving control system, comprising:
    collecting, by a communication unit including a transceiver, big data from an external server, the big data including a wheel torque and a speed for vehicle type, and traffic information;
    learning, by a control unit including a processor, a relationship between only the wheel torque and the speed among the big data, using a predetermined machine learning model;
    predicting, by the control unit, a motor torque of the driving vehicle by input of a specific desired speed profile to the learned relationship between the wheel torque and the speed; and
    calculating, by the control unit, an energy consumption required to generate the predicted motor torque using a predetermined dynamic programming method and a reverse vehicle dynamic model;
    deriving an optimal speed profile in which the energy consumption is reduced or minimized; and
    controlling, by the control unit, the driving vehicle according to the optimal speed profile.

2. The operating method of an intelligence vehicle driving control system according to claim 1, wherein calculating an energy consumption comprises:
    dividing a driving road of the driving vehicle into at least two road sections according to a speed condition for every road section and deriving the optimal speed profile for each of the at least two road sections.

3. The operating method of an intelligence vehicle driving control system according to claim 2, wherein calculating the energy consumption comprises:
    updating traffic information for a road section excluding a road section in which the vehicle currently travels, among two or more road sections.

4. The operating method of an intelligence vehicle driving control system according to claim 1, wherein calculating the energy consumption comprises:
    normalizing speed values of all vehicles which travel on the same path as the driving vehicle to calculate an average and a variance,
    determining a upper speed limit and a lower speed limit of the driving vehicle using the calculated average and the above-described variance, and
    deriving the optimal speed profile in consideration of the upper speed limit and the lower speed limit, by the control unit.

5. The operating method of an intelligence vehicle driving control system according to claim 4, wherein in calculating an energy consumption, when the upper speed limit and the lower speed limit are determined, the control unit applies a weight to the variance by considering whether to drive in accordance with a flow of surrounding vehicle or independently drive.

6. The operating method of an intelligence vehicle driving control system according to claim 1, wherein in calculating an energy consumption, the control unit considers an optimal speed according to a curvature of a road in which the driving vehicle travels as an optimal speed profile deriving condition.

7. The operating method of an intelligence vehicle driving control system according to claim 1, wherein the machine learning model includes a convolutional neural network (CNN) and a recurrent neural network (RNN).

8. The operating method of an intelligence vehicle driving control system according to claim 1, wherein the machine leaning model learns a rolling resistance, a gradient resistance, and an air resistance, among traffic information to be modeled.

9. An operating system, comprising:
a communication unit including a transceiver and configured to collect big data from an external server, the big data including a wheel torque and a speed for every vehicle type, and traffic information;
a control unit including a processor and configured to:
learn, using a predetermined machine learning model, a relationship between only the wheel torque and the speed among the big data;
predict a motor torque of a driving vehicle by input of a specific desired speed profile to the machine learning model to calculate the motor torque of the driving vehicle; and
calculate an energy consumption required to generate the predicted motor torque using a predetermined dynamic programming method and a reverse vehicle dynamic model;
derive an optimal speed profile in which the energy consumption is reduced or minimized; and
control the driving vehicle according to the optimal speed profile.

10. A vehicle configured to conduct a method of claim 1.
11. A vehicle comprising a system of claim 9.

12

* * * * *